Patented May 25, 1937

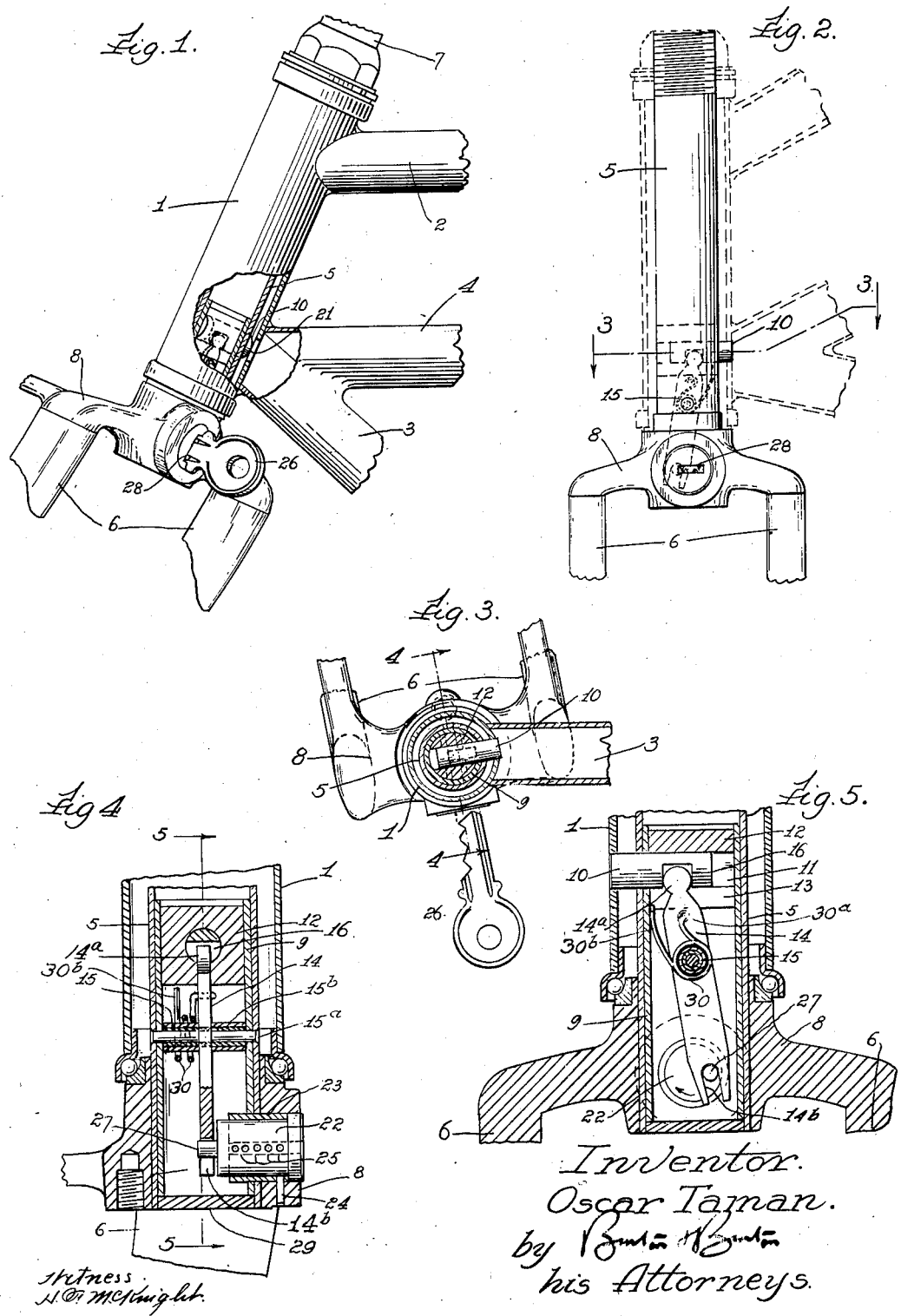

2,081,778

UNITED STATES PATENT OFFICE 2,081,778

BICYCLE LOCK

Oscar Taman, Chicago, Ill.

Application November 14, 1935, Serial No. 49,651

20 Claims. (Cl. 70—187)

This invention relates to locking means especially adapted for bicycles and like structures, and its object is to provide a lock of sturdy and inexpensive construction designed to be built into the bicycle frame as a permanent feature thereof, and arranged for locking the steering wheel against steering movement, and preferably at an angle to its normal straight-ahead position so as to make it impossible for the vehicle to be ridden, and extremely difficult for it to be carried away while thus locked. A further object is to arrange such a lock in an inconspicuous position in the vehicle without any unsightly projecting parts, but where it is conveniently accessible for locking or unlocking, preferably by means of a key. It is also an object of the invention to provide for installation of the locking means in a manner which shall in no way weaken, or impair the efficient operation of, the parts with which it is associated. Other objects will appear from the description which follows. The invention consists in certain features and elements of construction in combination, as herein shown and described and as indicated by the claims.

In the drawing:

Figure 1 is a side elevation of the front end portion of a vehicle frame including the crown and the upper portion of the fork in which the front wheel (not shown) of the vehicle is journaled.

Figure 2 is a direct rear elevation of the upper portion of the fork and its hollow stem with adjacent portions of the bicycle frame shown in dotted outline and in position corresponding to the locked condition of the fork.

Figure 3 is a transverse section through the stem and frame taken at the plane indicated at line 3—3 on Figure 2.

Figure 4 is a vertical section taken as indicated at line 4—4 on Figure 3.

Figure 5 is a vertical section at a plane substantially at right angles to that of Figure 4.

The bicycle lock, which is the subject of this invention, is designed for installation in a bicycle of substantially standard construction, so that no radical structural changes are required to accommodate the lock mechanism. Figure 1 shows fragmentary portions of a bicycle frame including the tubular head, 1, to which are rigidly and permanently attached the additional members, 2, 3 and 4, of the usual tubular frame, and in which there is rotatably mounted the hollow stem, 5, which extends upwardly from the fork, 6, in which the front wheel, not shown, is journaled, and by which it is carried for steering movement. A fragment of the handle-bar post is seen at 7, extending from the upper end of the head, 1, from which it projects, and in which it rotates in unison with the stem, 5, of the fork for controlling steering movement of the front wheel. The fork, 6, includes a "crown", 8, which connects the two fork arms with the stem, 5, said stem being rigidly secured in an opening which extends vertically through the crown, 8, as seen in Figure 5, and being reinforced by an inserted sleeve or bushing, 9, for a short distance at its lower end, including the portion of its length which engages the crown.

The locking mechanism includes a locking bolt, 10, which is slidably mounted in a guideway, 11, extending diametrically with respect to the hollow stem, 5, and formed in a plug or block, 12, which is rigidly secured in the tube, 9, as by brazing. As shown, the bolt, 10, is cylindrical in form, and the guideway, 11, is a cylindrical bore in which it fits snugly; below the guideway the plug, 12, is formed with a slot, 13, aligned with the guideway and communicating therewith to accommodate the upper end of a lever arm, 14, which is fulcrumed within the hollow stem, 5, by any suitable means, such as the pivot sleeve, 15, which is rigidly secured in the stem by a pin, 15ª, riveted in the stem. The upper end portion, 14ª, of the lever, 14, may be rounded, as shown, for engaging a notch, 16, in the bolt, 10. Thus when the lever swings about its pivot, 15, it will project the bolt, 10, transversely of the stem, 5, for engagement with the head, 1, of the frame, or when swung to its opposite limit will withdraw the bolt from such engagement.

As shown in the drawing, the securement of the plug or block, 12, in the tubular stem, 5, is effected through securement of the plug in the reinforcing sleeve, 9, which, in turn, is rigidly fastened in place in the hollow stem, 5. This facilitates assembly of the parts, since the plug, 12, may be placed in the bushing before the latter is inserted in the stem.

The head, 1, is formed with an aperture, 21, to receive the end of the bolt, 10, and, preferably, this aperture is located within the area of the head which is covered by the junction of the frame member, 3, with the head so that the opening is completely hidden in the finished bicycle. The relative location of the bolt, 10, and the aperture, 21, is such that they will register when the steering fork is turned at an angle of nearly 90 degrees to its normal straight-ahead position, as indicated in Figure 3. This ensures that when the parts are locked in this position it will be impossible for the bicycle to be ridden away, and very difficult and inconvenient for it to be carried or transported in a passenger automobile. Naturally, an unauthorized person attempting to carry a bicycle by hand when thus locked, would become conspicuous and open to suspicion.

For actuating the bolt, 10, and controlling its position through the lever, 14, I provide, preferably, a cylinder lock, as shown at 22, having a casing, 23, secured in a cylindrical bore formed in the crown, 8. A pin, 24, is shown driven into the crown to fix the casing, 23, of the lock against rotation. It will be understood that the cylinder, 22, carries a number of tumblers, indicated at 25, which interlock with a slot, not shown, in the casing, 23, or are released from such inter-engagement by the insertion of the usual key, 26. While the key is in the cylinder it may be rotated, and such rotation will carry its crank pin, 27, from one limit of movement at which it is shown in Figure 5, to its opposite limit, 180 degrees removed therefrom. As the pin, 27, swings through this arc its inter-engagement with a slot, 14b, in the lower end of the lever, 14, causes the latter to rock about its pivot, 15, for withdrawing the projected bolt, 10, into the plug, 12, and out of engagement with the aperture, 21, in the head, 1. To maintain engagement of the slotted end of the lever, 14, with the crank pin, 27, I may provide spacers, 15b, on the pivot pin, 15, for holding the lever in its proper plane. And to prevent rattling of the parts when the bicycle is ridden, a spring, 30, may be coiled around one of the spacers, 15b, and arranged with one end, 30a, hooked into an aperture in the lever, 14, and with its other end, 30b, bearing yieldingly against the inside of the sleeve, 9.

As shown, the lock cylinder is set into the rear face of the crown, 8, so that in the normal position of the fork the key slot, 28, is disposed within the width of the frame and below the bar, 3, but with sufficient clearance so that the handle of the key, 26, will not extend into contact with the bar, 3, or otherwise interfere with steering movement of the fork if the key should be left in the lock. The lower end of the hollow stem, 5, is shown closed by a disk, 29, which may be a forced fit, and which will thus prevent tampering with the lock and will protect it from mud and dust.

Thus it will be understood that for locking the bicycle the rider will dismount and swing the fork, 6, approximately at right angles to its normal straight-ahead position, at the same time rotating the cylinder, 22, by means of the key, 26, so as to project the bolt, 10, into contact with the inner surface of the tubular head, 1. By exerting a slight rotative pressure through key, 26, he will be able to feel when the fork is disposed at exactly the correct angle for registration of the bolt, 10, with the opening, 21. Figure 1 shows the fork approaching such position, but with the bolt still in contact with the wall of the head, 1, at the side of the opening, 21. When proper registration is thus effected the bolt will be projected fully into the opening, 21, and the key can be removed, leaving the fork thus locked in angular relation to the plane of the frame.

With the construction as described there is no elaborate structural change in the bicycle,—in fact, the frame itself requires only the formation of the aperture, 21, to adapt it to receive a fork having this lock built into its stem and crown. Thus, if desired, all bicycles turned out by a given manufacturer may have the aperture, 21, provided in the frame, and the locking type of fork may be sold as an optional feature to be installed by the dealer, who can readily remove the standard fork which is made without a lock, and replace it with the special fork having a lock made in accordance with my invention. The factory installation of the lock in the fork is also comparatively simple, since it involves only the placement and securement of the plug, 12, the fastening pin, 15a, and the lock casing, 23.

If desired, the key, 26, may be left in the lock when the bicycle is ridden, and its position at the rear side of the crown protects it against being broken off if the bicycle is laid down or accidentally dropped. The use of a key lock with the lock installed permanently in the bicycle, and the key held by the owner when the bicycle is left locked, will be of special advantage in the event a theft is committed, because the possession of the key will usually be of assistance in proving ownership when the bicycle is recovered by the police.

While there is shown and described herein certain specific structure embodying the invention, it will be manifest to those skilled in the art that various modifications and re-arrangements of the parts may be made without departing from the spirit and the scope of the invention, and that the same is not limited to the particular form herein shown and described, except in so far as indicated by the appended claims.

I claim:

1. A lock for a bicycle frame having a fixed tubular head with a wheel fork including a crown portion and a hollow stem rotatable in the head, a block fitted rigidly in the hollow stem and formed with a guideway extending diametrically therein, a bolt slidable in said guideway for projection from the stem into engagement with the head, a key-controlled cylinder lock mounted in the crown, and means positively connecting said bolt with said lock for actuation thereby into and out of engagement with the head.

2. A lock for a bicycle having a fixed tubular head with a wheel fork including a crown and a hollow stem rotatable in the head, said lock including a bolt slidable transversely in the stem for engagement with the head, a key-controlled cylinder mounted in the crown for rotation about an axis transverse to that of the stem and transverse to that of the bolt, a lever fulcrumed between its ends in the stem and having one end engaged with the bolt, a crank on the cylinder engaging the other end of the lever, and a spring stressed to urge the bolt out of engagement with the head.

3. A lock for a bicycle having a fixed tubular head with a wheel fork including a crown and a hollow stem rotatable in the head, said lock including a reinforcing sleeve telescopically fitted into the hollow stem, a guide block in the upper end of said sleeve having a transverse guideway, a locking bolt slidable in said guideway, the sleeve and stem being apertured in registration with one end of the guideway for projection of the bolt to engage the head, said block having a slot opening downwardly from the guideway, a lock cylinder rotatably mounted in the crown and a lever fulcrumed on the sleeve between the bolt and the cylinder, the bolt having a downwardly open recess into which the upper end of the lever extends, the lower end of the lever being engaged with the lock cylinder for transmitting movement therefrom to the bolt.

4. In the combination defined in claim 3, a spring reacting between the lever and the sleeve in a direction to urge the bolt out of engagement with the head.

5. In the combination defined in claim 3, the inner wall of the sleeve serving to limit the movement of the bolt for disengagement from the head, and a spring reacting between the lever and the sleeve urging the parts to such limit.

6. A lock for a bicycle having a fixed tubular head with a wheel fork including a crown and a hollow stem rotatable in the head, said lock including a reinforcing sleeve telescopically fitted into the hollow stem, a guide block rigid in the upper end of said sleeve having a transverse guideway, a locking bolt slidable in said guideway, the sleeve and stem being apertured in registration with one end of the guideway for projection of the bolt to engage the head, said block having a slot opening downwardly from the guideway, the bolt having a downwardly open recess, a lever extending longitudinally in the sleeve with its upper end engaged in the recess of the bolt through the slot of the block, and a pivot for the lever comprising a tube extending diametrically within the sleeve abutting its inner wall surfaces, a rivet extending through the tube and through the walls of the sleeve and stem for anchoring the pivot tube therein, and actuating means engaging the lower end of the lever.

7. In the combination defined in claim 6, spacer sleeves on the pivot tube at opposite sides of the lever extending from its opposite faces to the inner walls of the sleeve for centering the lever with respect to the slot in the guide block.

8. A lock for a bicycle having a fixed tubular head with a wheel fork including a crown and a hollow stem rotatable in the head, said lock including a reinforcing sleeve telescopically fitted into the hollow stem, a guide block in the upper end of said sleeve having a transverse guideway, a locking bolt slidable in said guideway, said block having a slot opening downwardly from the guideway, a lever fulcrumed in the sleeve between its ends with its upper end extending through said slot into engagement with the bolt, a lock cylinder rotatably mounted in the crown and having a crank pin on its inner end inside the sleeve for actuating the bolt through the medium of the lever, and a disk closing the lower end of the hollow stem and disposed flush with the adjacent fork surface for enclosing the lock mechanism in the stem.

9. In the combination defined in claim 8, said reinforcing sleeve forming with the stem a shoulder a short distance inwardly from the surface of the crown to form a stop against which the disk is lodged within the crown.

10. A lock for a bicycle frame having a fixed tubular head with a wheel fork including a crown portion and a hollow stem rotatable in the head, said hollow stem having an aperture and means within the stem adjacent said aperture forming a guideway leading thereto, said lock including a bolt fitting snugly and movable in said guideway for protrusion from the aperture into engagement with the head, a key-controlled lock cylinder mounted in the crown, and means positively connecting said locking bolt with said lock cylinder for actuation thereby into and out of engagement with the head.

11. A lock for a bicycle frame having a fixed tubular head with a wheel fork including a crown portion and a hollow stem rotatable in the head, said hollow stem having an aperture and means within the stem adjacent said aperture forming a guideway leading thereto, said lock including a bolt fitting snugly and movable in said guideway for protrusion from the aperture into engagement with the head, a key-controlled lock cylinder mounted in the crown, and a lever fulcrumed in the stem and engaged with the bolt to move therewith whenever the bolt is moved into and out of engagement with the head, said lever being also engaged with the cylinder to be moved by rotation of the cylinder in either direction when the cylinder is released and turned by its key.

12. A lock for a bicycle frame having a fixed tubular head with a wheel fork including a crown portion and a hollow stem rotatable in the head, said hollow stem having an aperture and means within the stem adjacent said aperture forming a guideway leading thereto, said lock including a bolt fitting snugly and movable in said guideway for protrusion from the aperture into engagement with the head, a key-controlled lock cylinder rotatably mounted in the crown, said cylinder carrying a crank pin at its inner end, and a lever fulcrumed in the stem at an axis intermediate the cylinder and the bolt and having one end engaged in a recess in said bolt for moving with the bolt in either direction, the other end of said lever embracing said crank pin for transmitting motion from the latter to the bolt when the cylinder of the lock is turned in either direction by its key.

13. A lock for a bicycle frame having a fixed tubular head with a wheel fork including a crown portion and a hollow stem rotatable in the head, said hollow stem having an aperture, and means within the stem adjacent said aperture forming a guideway leading thereto, said lock including a bolt fitting snugly and movable in said guideway for protrusion from the aperture into engagement with the head, a key-controlled lock cylinder mounted in the crown, said cylinder having an opening to receive its key disposed in the rear face of said crown, and means adapted to transmit motion positively from said lock cylinder to said bolt in the direction to move the bolt into locking engagement with the head.

14. A lock for a bicycle having a fixed tubular head with a wheel fork including a crown and a hollow stem rotatable in the head, a block fitted rigidly in the hollow stem and formed with a guideway extending diametrically therein, a bolt slidable in said guideway for projection from the stem into engagement with the head, a key-controlled cylinder lock mounted in the crown, and means adapted to transmit motion from said lock cylinder to said bolt in the direction to move the bolt into locking engagement with the head.

15. A lock for a bicycle frame having a fixed tubular head with a wheel fork including a crown portion and a hollow stem rotatable in the head, said hollow stem having an aperture and means within the stem adjacent said aperture forming a guideway leading thereto, said lock including a bolt fitting snugly and movable in said guideway for protrusion from the aperture into engagement with the head, a key-controlled lock cylinder mounted in the crown, and means adapted and positioned to transmit motion from said lock cylinder to said bolt to move the bolt in said guideway.

16. A lock for a bicycle having a fixed tubular head with a wheel fork including a crown and a hollow stem rotatable in the head, a block fitted rigidly in the hollow stem and formed with a guideway extending transversely in the stem, said lock including a bolt shiftable in said guideway for engagement with the head, a key-controlled cylinder mounted in the crown for rotation therein, a crank on the cylinder, and a member having one end engaged with said crank and the other end engaged with the bolt for transmitting movement from the cylinder to shift the bolt in said guideway.

17. A lock for a bicycle having a fixed tubular head with a wheel fork including a crown and a hollow stem rotatable in the head, said hollow stem having an aperture and means within the stem adjacent said aperture forming a guideway leading thereto, said lock including a bolt shiftable in said guideway for engagement with the head, a key-controlled cylinder mounted in the crown for rotation therein, a spring stressed to urge the bolt out of locking engagement with the head, and a member operatively connecting the bolt with the cylinder adapted to transmit movement from the cylinder to shift the bolt into locking engagement with the head.

18. A lock for a bicycle having a fixed tubular head with a wheel fork including a crown and a hollow stem rotatable in the head and means in the stem forming a guideway extending transversely of the stem, said lock including a bolt shiftable in said guideway into and out of engagement with the head, and means controlling the position of the bolt including an individual lock unit mounted in the crown for rotation therein and means transmitting movement from the lock unit to the bolt for shifting the bolt.

19. A lock for a bicycle having a fixed tubular head with a wheel fork including a crown and a hollow stem rotatable in the head, a block secured in the stem and formed with a guideway extending transversely in the stem, said block having a slot in its under side extending along, and opening into, the guideway, a bolt shiftable in the guideway into and out of engagement with the head, and means controlling the position of the bolt comprising a key-controlled cylinder mounted in the crown for rotation therein and means extending into the slot and engaging the bolt for transmitting movement from the cylinder to the bolt for shifting the bolt.

20. A lock for a bicycle having a fixed tubular head with a wheel fork including a crown and a hollow stem rotatable in the head, means in the stem forming a guideway extending across the stem and having an opening leading downwardly from the guideway, a bolt shiftable in the guideway into and out of engagement with the head, and means controlling the position of the bolt comprising an individual lock unit mounted in the fork with means extending from said lock unit through the opening from the guideway and engaging the bolt for transmitting movement from said lock unit to shift the bolt.

OSCAR TAMAN.